United States Patent
Mimura et al.

(10) Patent No.: US 10,589,752 B2
(45) Date of Patent: Mar. 17, 2020

(54) DISPLAY SYSTEM, DISPLAY METHOD, AND STORAGE MEDIUM

(71) Applicant: HONDA MOTOR CO., LTD., Minato-ku, Tokyo (JP)

(72) Inventors: Yoshitaka Mimura, Wako (JP); Kenji Sugiyama, Wako (JP); Masayuki Takahashi, Wako (JP); Takashi Watanabe, Wako (JP); Masaya Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/180,089

(22) Filed: Nov. 5, 2018

(65) Prior Publication Data
US 2019/0144004 A1 May 16, 2019

(30) Foreign Application Priority Data

Nov. 10, 2017 (JP) ................................. 2017-217676

(51) Int. Cl.
*B60W 50/14* (2020.01)
*G01C 21/36* (2006.01)
(Continued)

(52) U.S. Cl.
CPC ............ *B60W 50/14* (2013.01); *B60W 30/12* (2013.01); *B60W 30/16* (2013.01); *G01C 21/3635* (2013.01); *G01C 21/3676* (2013.01)

(58) Field of Classification Search
CPC ...... B60W 30/12; B60W 30/16; B60W 50/14; G01C 21/3635; G01C 21/3676
See application file for complete search history.

(56) References Cited

U.S. PATENT DOCUMENTS

| 5,906,654 | A | * | 5/1999 | Sato | .................... | G01C 21/3605 |
| | | | | | | 701/418 |
| 7,430,473 | B2 | * | 9/2008 | Foo | ...................... | G01C 21/367 |
| | | | | | | 340/995.15 |

(Continued)

FOREIGN PATENT DOCUMENTS

| DE | 102009060391 | | 6/2011 | | |
| DE | 102009060391 | A1 * | 6/2011 | ............. | B60K 35/00 |

(Continued)

OTHER PUBLICATIONS

German Office Action for German Patent Application No. 102018218843.2 dated Jun. 19, 2019.

(Continued)

*Primary Examiner* — Babar Sarwar
(74) *Attorney, Agent, or Firm* — Amin, Turocy & Watson, LLP

(57) ABSTRACT

A display system includes: a first display unit (400) that displays an image indicating a driving assist state of a vehicle which includes an automated driving state; a second display unit (400) that displays an image that resembles a road on which the vehicle travels; and a display control unit (120) that allows the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane.

9 Claims, 10 Drawing Sheets

(51) Int. Cl.
  *B60W 30/16* (2020.01)
  *B60W 30/12* (2020.01)

(56) References Cited

U.S. PATENT DOCUMENTS

| | | | | |
|---|---|---|---|---|
| 7,630,806 | B2* | 12/2009 | Breed | B60R 21/0134 |
| | | | | 180/273 |
| 8,352,110 | B1* | 1/2013 | Szybalski | B62D 1/286 |
| | | | | 701/23 |
| 8,738,213 | B1* | 5/2014 | Szybalski | B60W 50/14 |
| | | | | 701/28 |
| 9,666,067 | B1* | 5/2017 | Nagpal | G08G 1/056 |
| 10,055,650 | B2* | 8/2018 | Yi | G06K 9/00798 |
| 2007/0290823 | A1* | 12/2007 | Watanabe | B60Q 1/2665 |
| | | | | 340/435 |
| 2009/0164062 | A1* | 6/2009 | Aoki | B60Q 1/0082 |
| | | | | 701/36 |
| 2012/0283942 | A1* | 11/2012 | T'Siobbel | G01C 21/26 |
| | | | | 701/410 |
| 2013/0179023 | A1* | 7/2013 | Schmidt | G05D 1/021 |
| | | | | 701/23 |
| 2014/0092237 | A1* | 4/2014 | Watanabe | B60R 1/00 |
| | | | | 348/118 |
| 2014/0267723 | A1* | 9/2014 | Davidson, Jr. | H04N 7/183 |
| | | | | 348/147 |
| 2014/0375816 | A1* | 12/2014 | Maihoefer | G02B 27/01 |
| | | | | 348/148 |
| 2015/0302259 | A1* | 10/2015 | Oshida | B60R 1/00 |
| | | | | 382/103 |
| 2016/0284218 | A1* | 9/2016 | Ejiri | G08G 1/167 |
| 2016/0288644 | A1* | 10/2016 | Bochenek | B60K 35/00 |
| 2017/0203770 | A1* | 7/2017 | Kondo | B60W 50/14 |
| 2017/0307395 | A1* | 10/2017 | Kim | B60R 1/00 |
| 2017/0334452 | A1* | 11/2017 | Abe | B60N 2/797 |
| 2018/0009374 | A1* | 1/2018 | Kim | G03B 21/206 |
| 2018/0058879 | A1* | 3/2018 | Tayama | G09B 29/00 |
| 2018/0105040 | A1* | 4/2018 | Ryu | B60W 50/14 |
| 2018/0128635 | A1* | 5/2018 | Nakamura | B60W 30/12 |
| 2018/0148072 | A1* | 5/2018 | Kamiya | G06K 9/0061 |
| 2018/0178649 | A1* | 6/2018 | Mimura | B60K 35/00 |
| 2018/0194367 | A1* | 7/2018 | Yamada | B60W 50/10 |
| 2018/0244153 | A1* | 8/2018 | Ejiri | G02B 27/0101 |

FOREIGN PATENT DOCUMENTS

| | | | |
|---|---|---|---|
| DE | 102011121948 | 6/2013 | |
| DE | 102015209004 | 11/2016 | |
| DE | 102015209004 A1 * | 11/2016 | ......... G08G 1/09623 |
| JP | 09-281889 | 10/1997 | |
| JP | 2007-178383 | 7/2007 | |
| JP | 2013-124886 | 6/2013 | |
| JP | 2015-199439 | 11/2015 | |
| JP | 2016-008894 | 1/2016 | |
| JP | 2017-146131 | 8/2017 | |

OTHER PUBLICATIONS

Japanese Office Action for Japanese Patent Application No. 2017-217676 dated Sep. 3, 2019.

* cited by examiner

DISPLAY SYSTEM, DISPLAY METHOD, AND STORAGE MEDIUM

CROSS-REFERENCE TO RELATED APPLICATION

Priority is claimed on Japanese Patent Application No. 2017-217676, filed Nov. 10, 2017, the content of which is incorporated herein by reference.

BACKGROUND OF THE INVENTION

Field of the Invention

The present invention relates to a display system, a display method, and a storage medium.

Description of Related Art

Recently, research on a technology of traveling a vehicle by automatically controlling at least one of acceleration/deceleration and steering of a host vehicle (hereinafter, referred to as "automated driving") has been in progress. In this regard, there is known a technology of allowing a display to display a travel lane of a host vehicle, and images of the host vehicle and nearby vehicles, and allowing the display to display a future travel route of the host vehicle with a line that extends from the host vehicle (for example, the specification of U.S. Pat. No. 8,738,213).

SUMMARY OF THE INVENTION

However, in the method of the related art, there is a possibility that it is difficult to determine whether or not the displayed route is a route for reaching a destination or a trajectory in consideration of nearby vehicles. According to this, it may be difficult to understand a driving assist state for the host vehicle from displayed content.

An aspect of the invention has been made in consideration of such circumstances, and an object thereof is to provide a display system a display method, and a storage medium which are capable of allowing an occupant to intuitively and visually recognize a driving assist state.

The display system, the display method, and the storage medium according to the invention employ the following configuration.

(1) According to an aspect of the invention, there is provided a display system including: a first display unit that displays an image indicating a driving assist state of a vehicle which includes an automated driving state; a second display unit that displays an image that resembles a road on which the vehicle travels; and a display control unit that allows the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane.

(2) In the display system according to the aspect (1), the display control unit may allow approximately the entire region of the region corresponding to the recommended lane to be displayed in a similar color with the image that is displayed by the first display unit and indicates the driving assist state of the vehicle.

(3) In the display system according to the aspect (1), the display control unit may allow the target trajectory to be displayed in a region narrower than a lane in which the vehicle travels in a similar color with the image that is displayed by the first display unit and indicates the driving assist state of the vehicle.

(4) In the display system according to the aspect (1), the first display unit may be at least one of a region different from a region in which the second display unit is displayed in the same display device as the second display unit, a light-emitting unit that is provided in a steering wheel, a light-emitting unit that is provided in a door of the vehicle, and a light-emitting unit that is provided in an instrument panel.

(5) In the display system according to the aspect (1), in a case where a plurality of lanes, in which the vehicle is capable of travelling in the automated driving, exist, the display control unit may allow the second display unit to display the lanes by changing a color for every lane in which travel is possible in correspondence with the degree of recommendation for every lane in which travel is possible.

(6) In the display system according to the aspect (1), in a case where lane changing of the vehicle is executed by the automated driving, the display control unit may allow approximately the entire region of a lane that is a lane changing destination to be displayed in a predetermined color, and then may allow an animation image that gives an advance notice of the lane changing to be displayed.

(7) In the display system according to the aspect (1), the display control unit may allow the second display unit to display a display color of a lane in which the vehicle travels, and a display color of the target trajectory in a similar color and a color tone that is likely to be visually recognized by an occupant of the vehicle.

(8) According to another aspect of the invention, there is provided a display method that is executed by a computer. The display method includes: allowing a first display unit to display an image indicating a driving assist state of a vehicle which includes an automated driving state; allowing a second display unit to display an image that resembles a road on which the vehicle travels; and allowing the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane.

(9) According to still another aspect of the invention, there is provided a computer-readable non-transitory storage medium that stores a program that causes a computer to execute: allowing a first display unit to display an image indicating a driving assist state of a vehicle which includes an automated driving state; allowing a second display unit to display an image that resembles a road on which the vehicle travels; and allowing the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane.

According to the aspects (1) to (9), it is possible to allow an occupant to intuitively and visually recognize a driving assist state.

DETAILED DESCRIPTION OF THE INVENTION

Hereinafter, an embodiment of a display system, a display method, and a storage medium of the invention will be described with reference to the accompanying drawings. In the embodiment, a case where the display system allows a recognition result of the periphery of a vehicle when the vehicle performs automated driving (autonomous driving) to be displayed will be illustrated as an example. The automated driving represents that one or both of steering control and speed control are performed regardless of an operation by an occupant to allow the vehicle to travel, and is a kind of driving assist. In the embodiment, it is assumed that examples of the degree of driving assist include a first degree in which a driving assist device such as an adaptive cruise control system (ACC) and a lane keeping assistance system (LKAS) operates to execute the driving assist, a second degree in which a control degree is higher than the first degree, an occupant does not perform an operation on a driving operator of the vehicle, and at least one of acceleration/deceleration and steering of the vehicle is automatically controlled to execute automated driving, but a certain extent of periphery monitoring duty is imposed on the occupant, and a third degree in which the control degree is higher than the second degree, and the periphery monitoring duty is not imposed on the occupant (or periphery monitoring duty lower in comparison to the second degree is imposed). In this embodiment, driving assist corresponding to the second degree and the third degree corresponds to automated driving. In this embodiment, it is assumed that the "occupant" represents, for example, an occupant who sits in driver's seat, that is, a seat provided with a driving operator.

Overall Configuration

Figure 1:
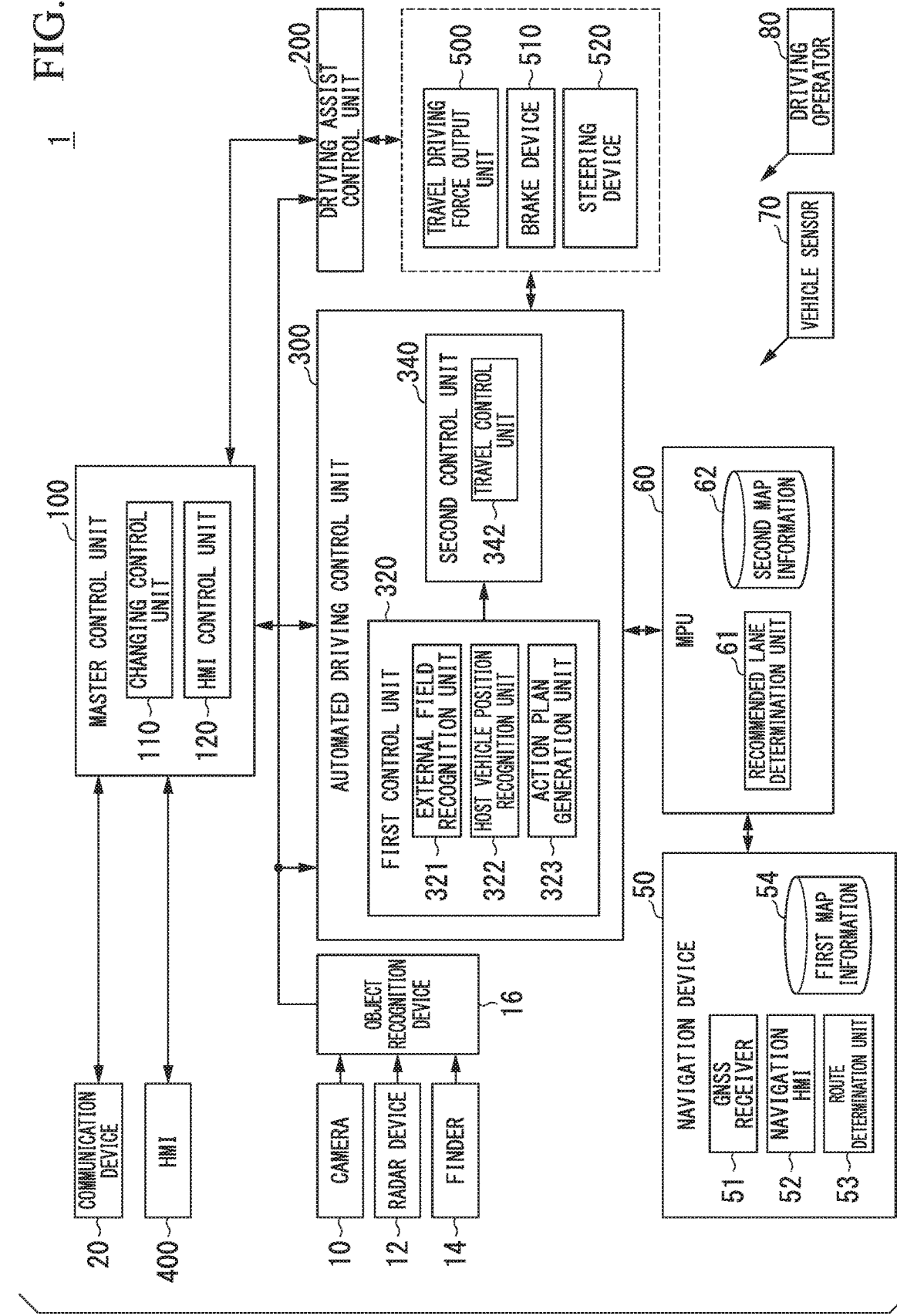
FIG. 1 is a configuration view of a vehicle system including a display system of an embodiment.

FIG. 1 is a configuration view of a vehicle system 1 including the display system of the embodiment. A vehicle in which the vehicle system 1 is mounted (hereinafter, referred to as host vehicle M) is, for example, a two-wheeled vehicle, a three-wheeled vehicle, a four-wheeled vehicle, or the like, and a driving source thereof is an internal combustion engine such as a diesel engine and a gasoline engine, an electric motor, or a combination thereof. The electric motor operates by using power generated by a generator connected to the internal combustion engine, or discharged power of a secondary battery or a fuel cell.

For example, the vehicle system 1 includes a camera 10, a radar device 12, a finder 14, an object recognition device 16, a communication device 20, a navigation device 50, a map positioning unit (MPU) 60, a vehicle sensor 70, a driving operator 80, a master control unit 100, a driving assist control unit 200, an automated driving control unit 300, a human machine interface (HMI) 400, a travel driving force output device 500, a brake device 510, and a steering device 520. The devices or apparatus are connected to each other through a multiplex communication line such as a controller area network (CAN) communication line, a serial communication line, a radio communication network, and the like. The configuration illustrated in FIG. 1 is illustrative only, and a part of the configuration may be omitted, or another configuration may be added. A combination of the HMI 400 and an HMI control unit 120 is an example of the "display system". The HMI 400 is an example of a display unit. The HMI control unit 120 is an example of a "display control unit". A first control unit 320 is an example of a "control unit".

The camera 10 captures an image of the periphery of the host vehicle M and generates a captured image. For example, the camera 10 is a digital camera using a solid-state imaging element such as a charge coupled device (CCD) and a complementary metal oxide semiconductor (CMOS). The camera 10 is mounted at an arbitrary site of the host vehicle M in which the vehicle system 1 is mounted. The periphery of the host vehicle includes an area in front of the host vehicle, and may include an area on a lateral side or a backward side of the host vehicle. In a case of capturing an image of an area in front of the host vehicle, the camera 10 is mounted on an upper side of a front windshield, a rear surface of a rearview mirror, and the like. In a case of capturing an image of an area on the backward side, the camera 10 is mounted on upper side of a rear windshield, a backdoor, and the like. In a case of capturing an image of an area on the lateral side, the camera 10 is mounted on a door mirror and the like. For example, the camera 10 periodically and repetitively captures an image of the periphery of the host vehicle M. The camera 10 may be a stereo camera.

The radar device 12 radiates electric waves such as a millimeter wave to the periphery of the host vehicle M, and detects electric waves (reflected waves) reflected by an object, thereby detecting at least a position (a distance and an orientation) of the object. One or a plurality of the radar devices 12 are mounted at an arbitrary site of the host vehicle M. The radar device 12 may detect a position and a speed of an object by a frequency modulated continuous wave (FMCW) method.

The finder 14 is a light detection and ranging or laser imaging detection and ranging (LIDAR) that measures scattered light with respect to irradiation light and detects a distance to a target. One or a plurality of the finders 14 are mounted at an arbitrary site of the host vehicle M.

The object recognition device 16 recognizes a position, a type, a speed, and the like of an object by performing sensor fusion processing with respect to detection results of a part or the entirety of the camera 10, the radar device 12, and the finder 14. The object recognition device 16 outputs a recognition result to the driving assist control unit 200 and the automated driving control unit 300.

For example, the communication device 20 performs communication with other vehicles which exist at the periphery of the host vehicle M by using a cellular network, a Wi-Fi network, Bluetooth (registered trademark), dedicated short range communication (DSRC), and the like, or performs communication with various server devices through a radio base station. The communication device 20 performs communication with terminal devices carried by persons at the outside of a vehicle.

For example, the navigation device 50 includes a global navigation satellite system (GNSS) receiver 51, a navigation HMI 52, and a route determination unit 53, and retains first map information 54 in a storage device such as a hard disk drive (HDD) and a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 70. The navigation HMI 52 includes a display device, a speaker, a touch panel, a key, and the like. A part or the entirety of the navigation HMI 52 may be common to the HMI 400 to be described later. For example, the route determination unit 53 determines a route from a position of the host vehicle M which is specified by the GNSS receiver 51 (or an arbitrary position that is input) to a destination that is input by an occupant by using the navigation HMI 52 (for example, including information related to a transit point in travel to the destination) with reference to the first map information 54. For example, the first map information 54 is information that expresses a road shape by a link indicating a road and a node that is connected by the link. The first map information 54 may include a curvature of a road, point of interest (POI) information, and the like. A route that is determined by the route determination unit 53 is output to the MPU 60. The navigation device 50 may perform route guide using the navigation HMI 52 on the basis of a route that is determined by the route determination unit 53.

For example, the MPU 60 functions as a recommended lane determination unit 61, and retains second map information 62 in a storage device such as an HDD and a flash memory. The recommended lane determination unit 61 determines a recommended lane for each block among routes provided from the navigation device 50 with reference to the second map information 62.

The second map information 62 is high-accuracy map information in comparison to the first map information 54. For example, the second map information 62 includes information of the center of a lane, information of the boundary of the lane, road information, traffic regulation information, address information, facility information, telephone number information, and the like. The second map information 62 may include information related to a section in which lane changing is possible or a section in which passing is possible.

The vehicle sensor 70 includes a vehicle speed sensor that detects a speed of the host vehicle M, an acceleration sensor that detects acceleration, a yaw rate sensor that detects an angular velocity around a vertical axis, an orientation sensor that detects a direction of the host vehicle M, and the like.

For example, the driving operator 80 may include an acceleration pedal, a brake pedal, a shift lever, a steering wheel, and other operators. The driving operator 80 is provided with a sensor that detects an operation amount or presence or absence of an operation, and a detection result is output to one or more among the master control unit 100, the driving assist control unit 200, the automated driving control unit 300, the travel driving force output device 500, the brake device 510, and the steering device 520.

Master Control Unit

For example, the master control unit 100 includes a changing control unit 110 and the HMI control unit 120. The constituent elements are realized, for example, when a hardware processor such as a central processing unit (CPU) executes a program (software). A part or all of the constituent elements may be realized by hardware (circuit unit; including a circuitry) such as a large scale integration (LSI), an application specific integrated circuit (ASIC), a field-programmable gate array (FPGA), and a graphics processing unit (GPU), or may be realized by the software and the hardware in cooperation. The program may be stored in a storage device (not illustrated) such as an HDD and a flash memory in the master control unit 100 in advance, or may be stored in a detachable storage medium such as a DVD and a CD-ROM, and may be installed in a storage device when the storage medium is mounted in a drive device.

For example, the changing control unit 110 changes the degree of driving assist on the basis of an operation signal that is input from a predetermined switch that is included in the HMI 400. For example, the changing control unit 110 may cancel driving assist and switch driving to manual driving on the basis of an operation that gives an instruction for the driving operator 80 such as the acceleration pedal, the brake pedal, and the steering wheel to perform acceleration, deceleration, or steering. Details of the function of the changing control unit 110 will be described later.

The changing control unit 110 may change the degree of driving assist on the basis of an action plan that is generated by an action plan generation unit 323. For example, the changing control unit 110 may terminate driving assist at an automated driving termination scheduled point that is defined in the action plan.

The HMI control unit 120 outputs information related to the degree of driving assist, a notification related to changing of the degree, and the like to the HMI 400. The HMI control unit 120 may output the information received by the HMI 400 to one or both of the driving assist control unit 200 and the automated driving control unit 300. Details of a function of the HMI control unit 120 will be described later.

Driving Assist Control Unit

The driving assist control unit 200 executes the first degree of driving assist. For example, the driving assist control unit 200 executes the ACC, the LKAS, and other kinds of driving assist control. For example, when executing the ACC, the driving assist control unit 200 controls the travel driving force output device 500 and the brake device 510 so that the host vehicle travels in a state in which an inter-vehicle distance between the host vehicle M and a preceding vehicle is maintained constant on the basis of information input from the camera 10, the radar device 12, and the finder 14 through the object recognition device 16. That is, the driving assist control unit 200 performs acceleration/deceleration control (speed control) based on the inter-vehicle distance from the preceding vehicle. When executing the LKAS, the driving assist control unit 200 control the steering device 520 so that the host vehicle M travels while keeping (lane keeping) a current travel lane. That is, the driving assist control unit 200 performs steering control for lane keeping. Types of the first degree of driving assist may include various kinds of control other than automated driving (the second degree and the third degree) in which a request for an operation of the driving operator 80 is not made.

Automated Driving Control Unit

For example, the automated driving control unit 300 executes the second degree of driving assist and the third degree of driving assist. For example, the automated driving control unit 300 includes the first control unit 320 and a second control unit 340. The first control unit 320 and the second control unit 340 are respectively realized when a processor such as a CPU executes a program. A part or all of the functional units may be realized by hardware such as the LSI, the ASIC, and the FPGA, or may be realized by software and the hardware in cooperation. The program may be stored in a storage device (not illustrated) such as an HDD and a flash memory in the automated driving control unit 300 in advance, or may be stored in a detachable storage medium such as a DVD and a CD-ROM, and may be installed in a storage device when the storage medium is mounted in a drive device.

For example, the first control unit 320 includes an external field recognition unit 321, a host vehicle position recognition unit 322, and the action plan generation unit 323. The external field recognition unit 321 recognizes a state such as a position, a speed, and an acceleration of a nearby vehicle on the basis of information input from the camera 10, the radar device 12, and the finder 14 through the object recognition device 16. The position of the nearby vehicle may be expressed by a representative point such as the center of gravity and a corner of the nearby vehicle, or may be expressed by a region expressed by a contour of the nearby vehicle. The "state" of the nearby vehicle may include acceleration, jerk, or an "action state" of the nearby vehicle (for example, whether or not the nearby vehicle is changing lanes or intends to change lanes).

The external field recognition unit 321 may recognize at least one of the above-described nearby vehicle, obstacles (for example, a guard rail, an electric pole, a parked vehicle, and a person such as a pedestrian), a road shape, and other objects.

For example, the host vehicle position recognition unit 322 recognizes a lane (travel lane) in which the host vehicle M travels, and a relative position and a relative posture of the host vehicle M with respect to the travel lane. For example, the host vehicle position recognition unit 322 recognizes the travel lane by comparing a pattern of a road partition line (for example, an arrangement of a solid line and a broken line) that is obtained from the second map information 62, and a pattern of a road partition line of the periphery of the host vehicle M which is recognized from an image that is captured by the camera 10. The host vehicle position recognition unit 322 may recognize a position and a posture of the host vehicle M with respect to the travel lane.

The action plan generation unit 323 generates an action plan so that the host vehicle M performs automated driving with respect to a destination and the like. For example, the action plan generation unit 323 determines events which are sequentially executed in the automated driving control to travel in a recommended lane determined by the recommended lane determination unit 61, and to correspond to a situation happening near the host vehicle M. Examples of the event in the automated driving include a constant speed travel event of travelling in the same lane at the same speed, a low-speed following event of following a preceding vehicle under a condition of a low speed (for example, 40 [km/h] or lower), a lane changing event of changing a travel lane of the host vehicle M, a passing event of passing a preceding vehicle, a merging event of allowing a vehicle to merge at a merging point, a branch event of allowing the host vehicle M to travel in a target direction at a branch point of a road, an emergency stop event of stopping the host vehicle M, and the like. During execution of the events, an action for avoidance may be planned on the basis of a situation happening near the host vehicle M (existence of a nearby vehicle or a pedestrian, narrowing of lanes due to load construction, and the like). The action plan generation unit 323 generates a target trajectory along which the host vehicle M will travel in the future in correspondence with the above-described various events and the like. The target trajectory is expressed by sequentially arranging points (trajectory points) which the host vehicle M reaches.

For example, the second control unit 340 includes a travel control unit 342. The travel control unit 342 controls the travel driving force output device 500, the brake device 510, and the steering device 520 so that the host vehicle M passes through the target trajectory generated by the action plan generation unit 323 at a scheduled time.

The HMI 400 presents various pieces of information to an occupant in a vehicle, and accepts an input operation by the occupant. For example, the HMI 400 includes a part or all of various display devices, a light-emitting unit, a speaker, a buzzer, a touch panel, various operation switches, and a key. Details of a function of the HMI 400 will be described later.

The travel driving force output device 500 outputs a travel driving force (torque) necessary for a vehicle to travel to driving wheels. For example, the travel driving force output device 500 includes a combination of an internal combustion engine, an electric motor, and a transmission, and an electronic control unit that controls these components. For example, the brake device 510 includes a brake caliper, a cylinder that transmits a hydraulic pressure to the brake caliper, an electric motor that generates the hydraulic pressure in the cylinder, and a brake ECU. The brake ECU controls the electric motor in accordance with information that is input from the travel control unit 342, or information that is input from the driving operator 80 in order for brake torque corresponding to a brake operation to be output to respective wheels. For example, the steering device 520 includes a steering ECU, and an electric motor. The steering ECU drives the electric motor in accordance with information that is input from the travel control unit 342 or information that is input from the driving operator 80 to change a direction of front steering wheels.

Configuration of HMI 400

Figure 2:
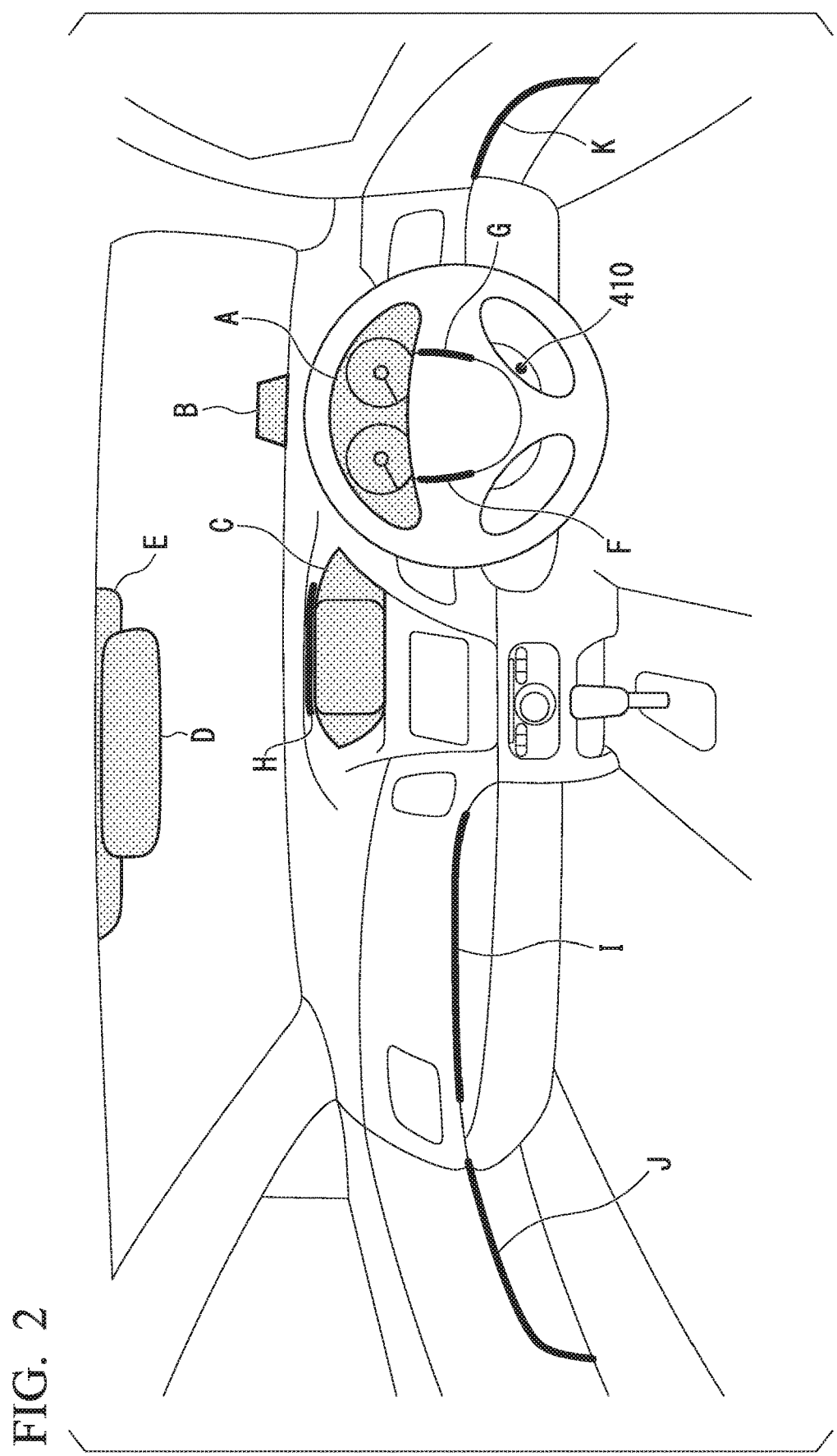
FIG. 2 is a view showing an example of an HMI in a host vehicle M.

Hereinafter, a configuration example of the HMI 400 of the embodiment will be described. FIG. 2 is a view showing an example of the HMI 400 in the host vehicle M. For example, the HMI 400 includes one or more display devices A to E, and one or more light-emitting units F to K. Here, at least one of the display devices A to E may be an example of a "first display unit" or may also be an example of a "second display unit". The "first display unit" and the "second display unit" may be constituted by the same display device. In this case, the "first display unit" and the "second display unit" may also be referred to as a "first display region" and a "second display region" on a display surface. For example, the first display region is a driving assist state display region 600 to be described later. For example, the second display region is a peripheral information display region 620 to be described later. At least one of the light-emitting units F to K is an example of the "first display unit".

For example, the display device A is a display device that is provided in an instrument panel in the vicinity of a front side of a driver's seat, and that can be visually recognized by an occupant from a gap of a steering wheel, or over the steering wheel. For example, the display device A is a liquid crystal display (LCD), an organic electroluminescence (EL) display device, or the like. Information necessary for travel of the host vehicle M during manual driving or automated driving, or information related to an instruction to the occupant is displayed on the display device A. Examples of the information necessary for travel of the host vehicle M during manual driving include a speed of the host vehicle M, the number of revolutions of an engine, a fuel residual amount, a radiator water temperature, a travel distance, and other pieces of information. On the other hand, examples of the information necessary for travel of the host vehicle M during automated driving includes a future trajectory of the host vehicle M, the degree of driving assist, an instruction for the occupant, and the like.

For example, the display device B is a head-up display (HUD). The display device B is disposed at a position that is higher in comparison to the display device A. The display device B projects a video to a predetermined imaging portion. For example, the display device B projects an image to a part of a front windshield in front of the driver's sheet to allow eyes of an occupant who sits in the driver's seat to visually recognize a virtual image. In the embodiment, the front windshield of the host vehicle M may be set as the second display unit instead of the display device B.

For example, the display device C is mounted at the central portion of the instrument panel. Examples of the display device C include an LCD, an organic EL display device, and the like. For example, the display device C displays an image corresponding to navigation processing that is executed by the navigation device 50, and the like. The display device C may display a television program, reproduce a DVD, or display content such as a downloaded movie.

The display device D displays a camera image that is obtained by capturing an image of an area on a backward side of the host vehicle M. Examples of the display device D include an LCD, an organic EL display device, and the like. For example, at least a part of a display surface of the display device D may be a mirror.

For example, the display device E is provided in a cover member that covers the camera 10 provided on an upper side of the front windshield to capture an image an area in front of the host vehicle M. Examples of the display device E include an LCD, an organic EL display device, and the like.

Examples of the light-emitting units F to K include lighting equipment such as a light-emitting diode (LED), and an indicator. The light-emitting units F to K are lighted or flickered with a predetermined color at a timing at which driving assist with respect to the host vehicle M is initiated or at a timing at which the degree of driving assist is changed. The light-emitting units F to K may continue lighting or flickering during the driving assist with respect to the host vehicle M continues.

An operation unit 410, and the light-emitting units F and G are provided in a steering wheel that is one of the driving operator 80. A gripping sensor (not illustrated) that detects gripping of the steering wheel by the occupant may be provided in the steering wheel. For example, the operation unit 410 includes a switch that switches initiation or termination of driving assist, or changes the degree of driving assist. When accepts a switch operation by the occupant, the operation unit 410 outputs information related to switching of initiation or termination of driving assist or changing of the degree of driving assist to the changing control unit 110.

For example, the light-emitting unit H is provided at a part of the display device C or in the vicinity thereof. The vicinity represents a range in which the shortest distance between the light-emitting unit H and the display device C is, for example, several [cm] (more specifically, approximately 3 [cm]) or less. In the example illustrated in FIG. 2, the light-emitting unit H that extends along at least one side that forms a screen shape of the display device C is mounted. For example, the light-emitting unit 1 is provided in the instrument panel in the vicinity of a front side of an assistant driver's seat. For example, the light-emitting units J and K are respectively provided in a left-front door and a right-front door of the host vehicle M.

Display Control of HMI 400 Related to Driving Assist

Next, display control of the HMI 400 related to driving assist will be described. In the following example of a display screen is set as a display screen that is displayed on the display device A, and a layout of the display screen is illustrative only and can be changed in an arbitrary manner. The layout represents arrangement, colors, scales, and the like. The HMI control unit 120 outputs information to the HMI 400 in respective situations based on the degree of driving assist with respect to the host vehicle M. Hereinafter, display control corresponding several situations will be described.

Situation (1)

For example, a situation (1) is a situation in which the vehicle system 1 executes the first degree of driving assist. In this situation, driving control such as the ACC and the LCAS are executed, and the occupant is requested to perform an operation of gripping the steering wheel. A screen example of the situation is illustrated in FIG. 3.

Figure 3:
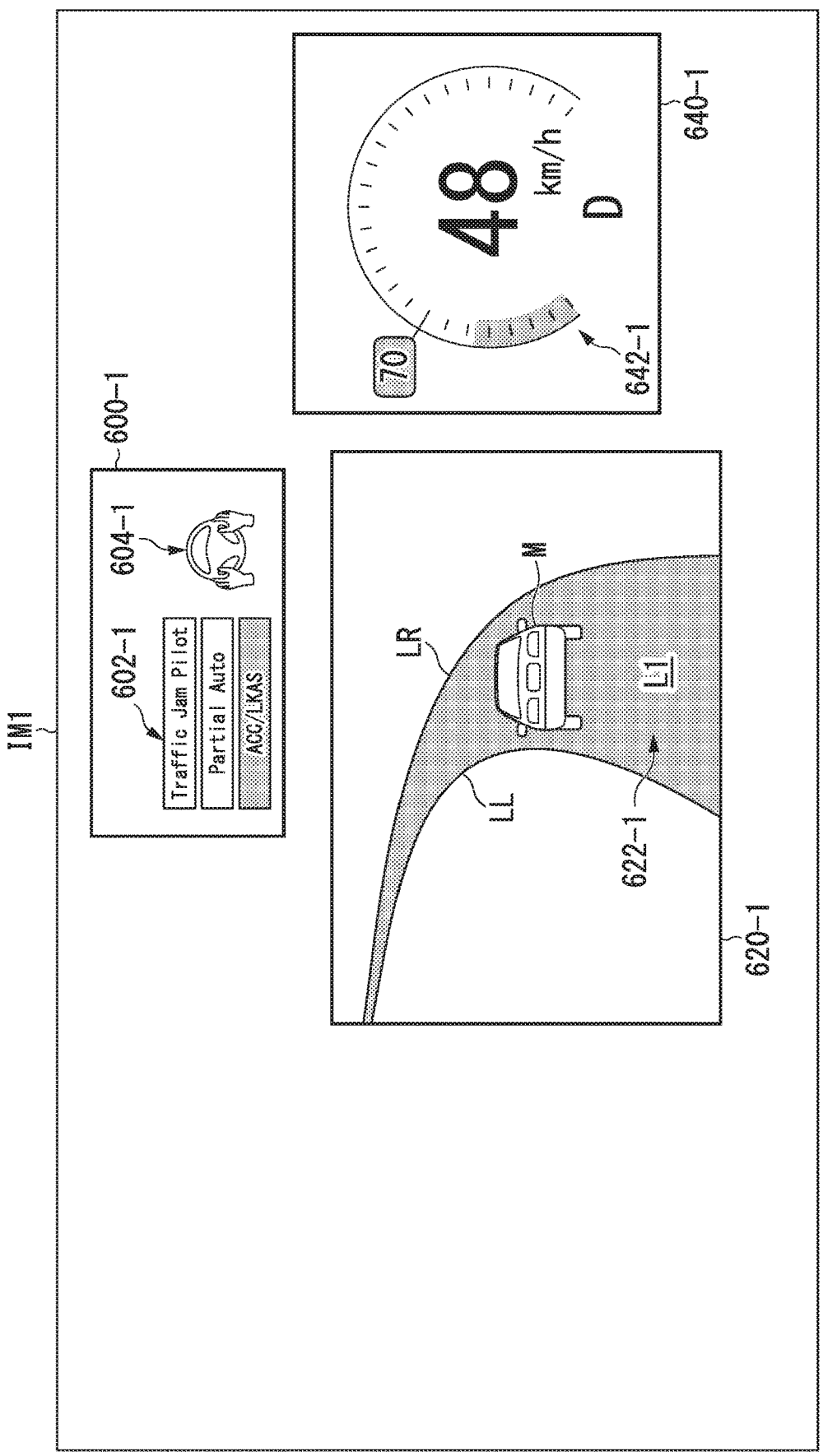
FIG. 3 is a view showing an example of a screen that is displayed in a situation in which a first degree of driving assist is executed.

FIG. 3 is a view showing an example of a screen IM1 that is displayed in a situation in which the first degree of driving assist is executed. The screen IM1 includes a driving assist state display region 600-1, a peripheral information display region 620-1, and a travel state display unit 640-1 as a region in which information related to driving assist is displayed. Hereinafter, respective regions in screens IM1 to IMX are referred to as a driving assist state display region 600-X, a peripheral information display region 620-X, and a travel state display unit 640-X.

The HMI control unit 120 allows the driving assist state display region 600-1 to display information indicating driving assist (including automated driving) state candidates which can be executed by the host vehicle M. In the example of FIG. 3, as information indicating the driving assist state candidate, an image 602-1 that shows three indicators including "ACC/LKAS", "Partial Auto", "Traffic Jam Pilot" is illustrated. For example, the degree of driving assist is displayed by each indicator, or a combination of a plurality of indicators.

The indicator "ACC/LKAS" represents that the host vehicle M executes driving assist at the first degree such as the ACC and the LKAS, or a state capable of transitioning to the first degree of driving assist. Whether or not driving assist is executed at the first degree, or whether or not a state is the state capable of transitioning to the first degree of driving assist can be understood by a request operation notification image 604 to be described later.

The indicator "Partial Auto" represents a state in which the host vehicle M executes the second degree of driving assist in which the occupant may not perform an operation on the driving operator 80, but a peripheral monitoring duty is imposed on the occupant, or a state capable of transitioning to the second degree of driving assist. Whether or not driving assist is executed at the second degree, or whether or not a state is the state capable of transitioning to the second degree of driving assist can be understood by the request operation notification image 604.

The indicator "Traffic Jam Pilot (hereinafter, referred to as "TJP") represents that the host vehicle M executes driving assist at the third degree such as the TJP, or a state capable of transitioning to the third degree of driving assist. For example, the TJP is a control state that follows a preceding vehicle at a speed equal to or lower than a predetermined speed (for example, 60 [km]). For example, the TJP may be operated when a speed of the host vehicle M is equal to or lower than a predetermined speed, and an inter-vehicle distance from a preceding vehicle is within a predetermined distance, or may be operated when the operation unit 410 accepts an operation of the occupant. Whether or not the TJP is executed, or whether or not a state is the state capable of transitioning to the driving assist of the TJP can be understood by the request operation notification image 604.

The HMI control unit 120 allows the driving assist state display region 600-1 to display the request operation notification image 604-1 at a display position corresponding to the image 602-1 that shows the three indicators including "ACC/LKAS", "Partial Auto", and "Traffic Jam Pilot". "Corresponding" represents an aspect in which a guideline indicating a lateral arrangement, a vertical arrangement, and a correlation exists, and a corresponding relationship can be recognized by human beings. As an example, the "display position corresponding to the image 602-1" is a display position adjacent to the image 602-1, and represents a display position within several [cm] or less (for example, 3 [cm] or less) from at least one of an upper side, a lower side, a left side, and a right side on the basis of the display position of the image 602-1. For example, the request operation notification image 604-1 is an image that indicates a predetermined operation that is performed by the occupant with respect to the driving operator 80. Examples of the request operation notification image 604-1 include an image indicating the driving operator 80, and an image indicating a predetermined portion of the occupant. For example, the request operation notification image 604-1 is an image that schematically illustrates a positional relationship between the steering wheel and hands of the occupant.

The HMI control unit 120 allows the peripheral information display region 620-1 to display an image that resembles a road, which is acquired from the second map information 62, in front of the host vehicle M, an image indicating the host vehicle M that is recognized by the host vehicle position recognition unit 322, and an image indicating a nearby vehicle m that recognized by the external field recognition unit 321. The HMI control unit 120 may allow an image indicating all nearby vehicles m recognized by the external field recognition unit 321 to be displayed, or may allow only a nearby vehicle m that has an influence on a future trajectory of the host vehicle M among the all nearby vehicles m.

The HMI control unit 120 allows the travel state display unit 640-1 to display an image 642-1 indicating a speed of the host vehicle. FIG. 3 illustrates an example in which the host vehicle M accelerates to a target speed (for example, 70 [km/h]) that is determined by the action plan generation unit 323 in accordance with driving assist.

In the situation (1), the HMI control unit 120 allows the driving assist state display region 600-1 to display an image indicating an indicator of "ACC/LKAS" in the image 602-1 of the three indicators in a color (first color) different from that of other indicators. The HMI control unit 120 allows the driving assist state display region 600-1 to display the request operation notification image 604-1 indicating that hands of the occupant grip the steering wheel. At this time, a color of the request operation notification image 604-1 is a similar color with the color of the indicator of "ACC/LKAS". For example, the similar color is classified to the same color in 24-hue circle of a practical color co-ordinate system (PCCS), and is classified to the same category even in luminosity or chroma.

The HMI control unit 120 allows the peripheral information display region 620-1 to display an image of a lane L1 that resembles a road on which the host vehicle M that is displayed travels, an image of left and right road partition lines LL and LR which partition the lane L1, and an image of the host vehicle M. For example, the lane L1 is a recommended lane that is determined by the recommended lane determination unit 61. The HMI control unit 120 allows approximately the entire region 622-1 corresponding to the lane L1 to be displayed in a predetermined color. For example, "approximately the entire region 622-1" represents a region of approximately 90[%] or more in the region partitioned by the road partition lines LL and LR. For example, "approximately the entire region 622-1" may be a region of 100[%] (excluding portions corresponding to the road partition lines LL and LR), or may be a region in which an offset is provided between the road partition lines LL and LR and which becomes a ratio of 90[%] or greater. For example, the predetermined color is a similar color with the first color.

In a case where a plurality of lanes in which the host vehicle M can travel exist, the HMI control unit 120 may allow the lanes to be displayed by changing a color for every lane in correspondence with the degree of recommendation for every lane in which travel is possible. For example, the degree of recommendation is a degree of recommending travel of the host vehicle M on the basis of the degree of congestion for every lane or a route to a destination. With regard to the degree of recommendation, the faster a predicted arrival time to the destination is or the smaller the number of times of lane changing in the route to the destination is, the higher the degree of recommendation is. The degree of recommendation of a passing lane may be set to be lower than the degree of recommendation of a travel lane. For example, as the degree of recommendation is higher, the HMI control unit 120 allows a lane to be displayed in a dark color, or allows the lane in a color that is more conspicuous in comparison to other lanes. When colors of lanes are set to be different from each other in correspondence with the degree of recommendation, it is possible to allow an occupant to easily understand the degree of recommendation for every lane.

The HMI control unit 120 may allow at least a part of the image 642-1, which is displayed on the travel state display unit 640-1 and indicates the speed of the host vehicle, to be displayed in a similar color with the first color. When the part is allowed to be displayed in a similar color with the first color, it is possible to allow the occupant to easily understand the degree of driving assist.

Situation (2)

For example, a situation (2) represents a situation in which the vehicle system 1 executes the second degree of driving assist. In this situation, automated driving control is executed, and an image indicating that the occupant is not necessary to grip the steering wheel is displayed. A screen example of the situation is illustrated in FIG. 4.

Figure 4:
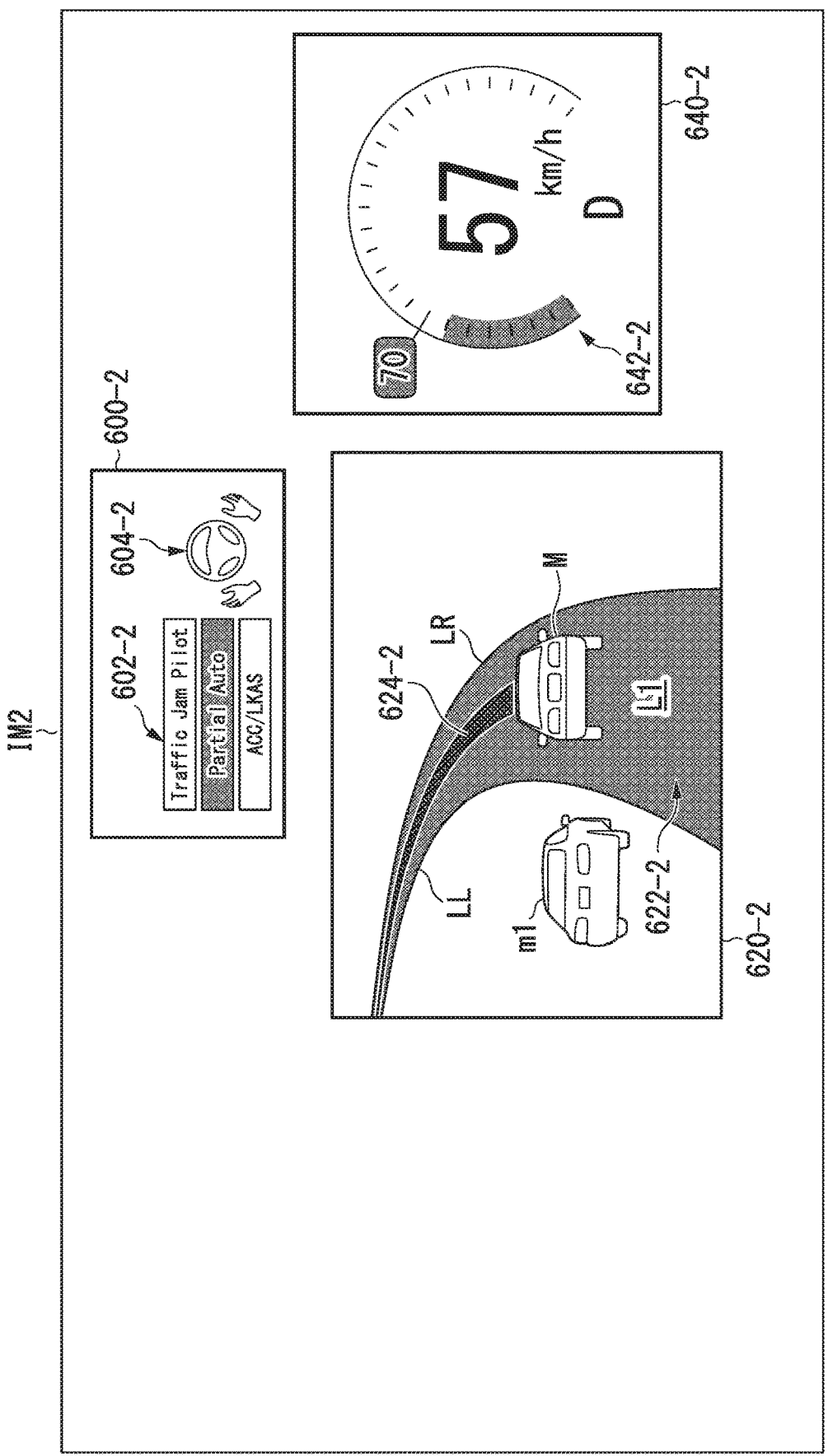
FIG. 4 is a view showing an example of a screen that is displayed in a situation in which a second degree of driving assist is executed.

FIG. 4 is a view showing an example of a screen IM2 that is displayed in a situation in which the second degree of driving assist is executed. In the situation (2), the HMI control unit 120 allows a driving assist state display region 600-2 to display an image indicating an indicator of "Partial Auto" in an image 602-2 of three indicators in a color different that of the other indicators. In this case, the HMI control unit 120 allows the image indicating "Partial Auto" to be displayed in a second color different from the above-described first color. The HMI control unit 120 allows the driving assist state display region 600-2 to display a request operation notification image that makes a request for an occupant to separate hands from the steering wheel. At this time, a color of a request operation notification image 604-2 is a similar color with the second color.

The HMI control unit 120 allows a peripheral information display region 620-2 to display approximately the entire region 622-2 of a lane L1 that resembles a road on which the displayed host vehicle M travels in a similar color with the second color. In addition, the HMI control unit 120 allows an image 624-2 of a target trajectory generated by the action plan generation unit 323 to be displayed in a region narrower than the lane L1. For example, the narrower region is a region having a width of approximately 20[%] of a vehicle width of the lane L1. The HMI control unit 120 may allow the image 624-2 to be displayed in a manner of overlapping an image of the lane L1, or in a three-dimensional manner to be floated to a predetermined height from a road surface of the lane L1. The HMI control unit 120 allows the peripheral information display region 620-2 to display an image of a nearby vehicle m1.

The HMI control unit 120 allows a display color of the lane L1 and a display color of the image 624-2 indicating the target trajectory to be displayed in a similar color and a color tone that is likely to be visually recognized by an occupant. For example, the HMI control unit 120 allows approximately the entire region 622-2 of the lane L1 to be displayed a light color of the second color, and allows the image 624-2 indicating the target trajectory to be displayed in a dark color of the second color.

The HMI control unit 120 may allow at least a part of the image 642-2, which is displayed on the travel state display unit 640-2 and indicates the speed of the host vehicle, to be displayed in a similar color with the second color. According to this, in the situation (2), display is performed by using the second color different from the color in the situation (1), and thus it is possible to allow an occupant to easily understand a difference in the degree of driving assist. Visibility of information related to driving assist is improved, and thus it is possible to allow the occupant to intuitively and visually recognize a driving assist state.

In a case where the situation (1) is changed to the situation (2), that is, the degree of driving assist is changed, with regard to the color of approximately the entire region 622-2 of the lane L1 and the color of the image 624-2 indicating the target trajectory, the HMI control unit 120 may allow both of the first color and the second color to be displayed before and after the changing. According to this, the occupant can more accurately understand a timing at which the degree of driving assist is changed, or a switching timing of manual driving and automated driving.

Situation (3)

Figure 5:
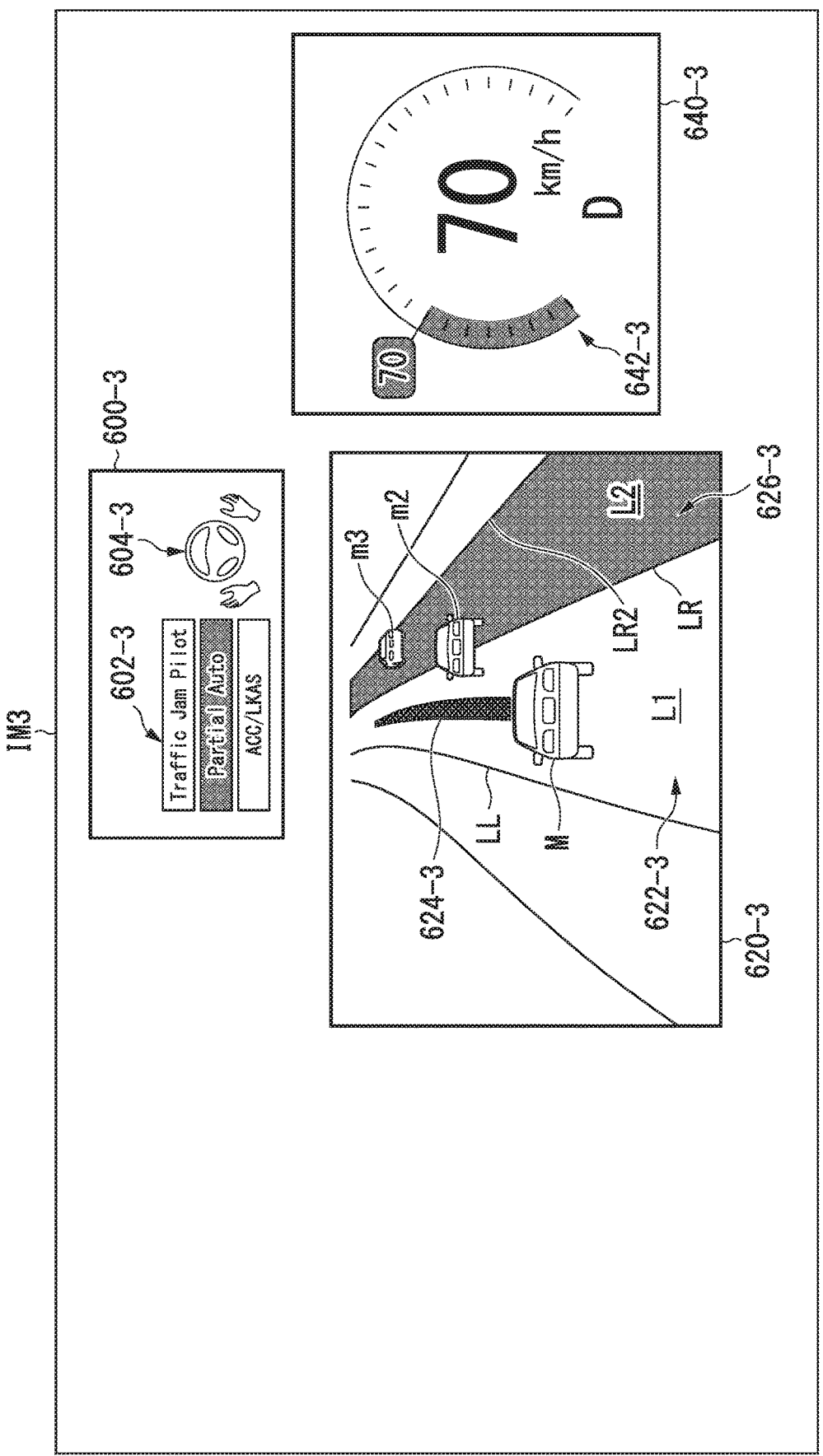
FIG. 5 is a view showing an example of a screen that is displayed in a situation in which lane change is initiated.

For example, a situation (3) represents a situation in which lane changing is initiated in a case where the vehicle system 1 executes the second degree of driving assist. FIG. 5 is a view showing an example of a screen IM3 that is displayed in a situation in which lane changing is initiated. In the situation (3), a display content of a driving assist state display region 600-3 and a display content of the driving assist state display region 600-2, which are allowed to be displayed by the HMI control unit 120, are the same as each other, and a display content of a travel state display unit 640-3 and a display content of the travel state display unit 640-2 are the same as each other. Accordingly, detailed description thereof will be omitted.

The HMI control unit 120 allows the peripheral information display region 620-3 to display an image of a lane L1 that resembles a road on which the host vehicle M travels, an image of a lane L2 that is lane changing destination, and images of nearby vehicles m2 and m3. The lane L2 is a region that is partitioned by a road partition lines LR and LR2. At this time, in a case where lane changing is initiated, the HMI control unit 120 allows approximately the entire region 626-3 of the lane L2 to be displayed in a similar color with the second color. In this step, an image 624-3 of a target trajectory is displayed on the lane L1. According to this, the occupant can understand the lane L2 that is a lane changing destination before a behavior of the host vehicle M is changed due to lane changing.

Situation (4)

Figure 6:
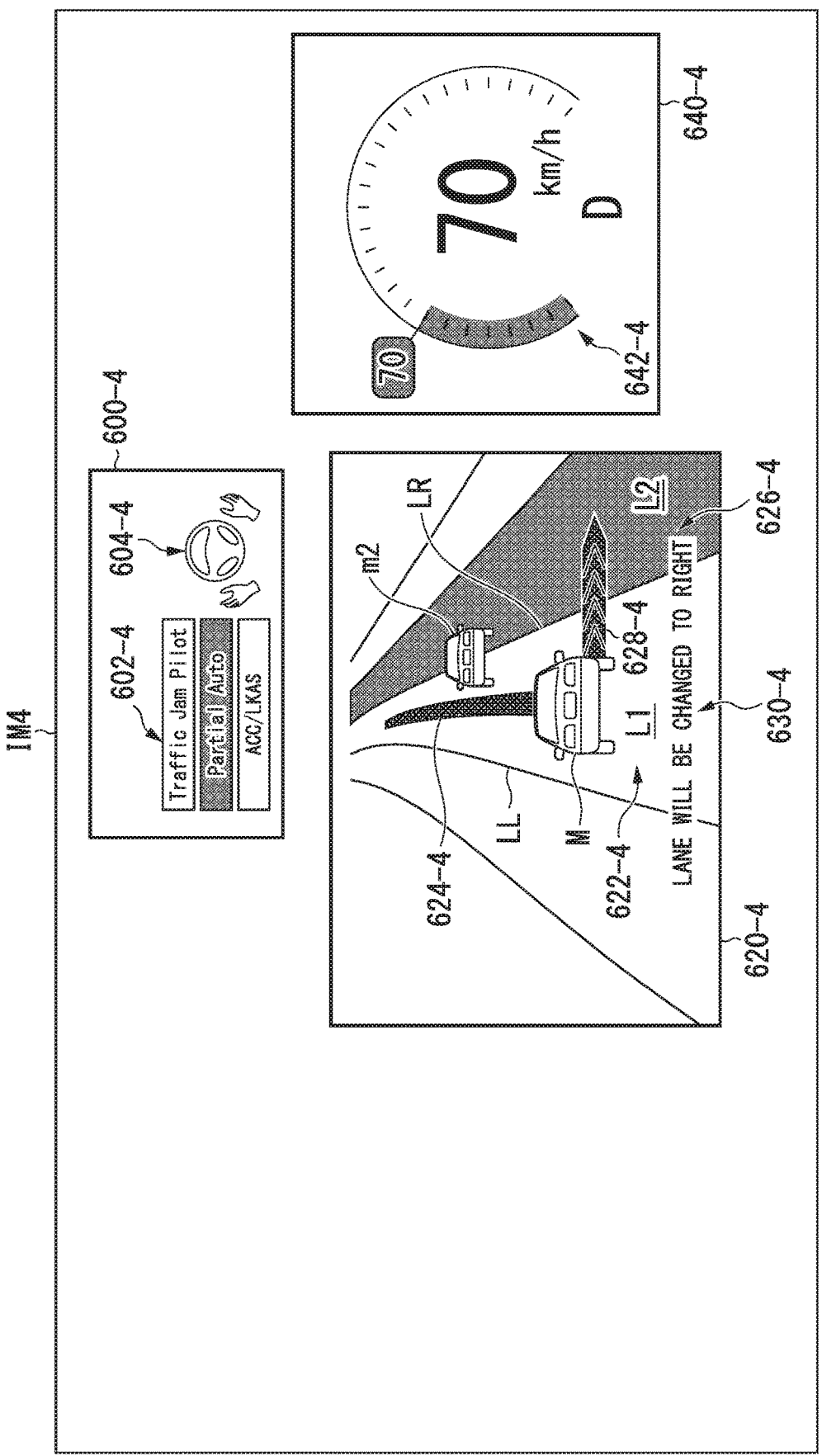
FIG. 6 is a view showing an example of a screen that is displayed in a situation after a lane of a lane change destination is displayed by a similar color with a second color.

For example, a situation (4) represents a situation after the lane L2 that is the lane changing destination is displayed in a similar color with the second color. FIG. 6 is a view showing an example of a screen IM4 that is displayed in a situation after the lane L2 that is the lane changing destination is displayed in a similar color with the second color. In the situation (4), a display content of a driving assist state display region 600-4 and a display content of the driving assist state display region 600-2, which are allowed to be displayed by the HMI control unit 120, are the same as each other, and a display content of a travel state display unit 640-4 and a display content of the travel state display unit 640-2 are the same as each other. Accordingly, detailed description thereof will be omitted.

The HMI control unit 120 allows the peripheral information display region 620-4 to display an animation image 628-4 which gives an advance notice of lane changing of the host vehicle M in addition to the content that is displayed in the situation (3). Examples of the animation image include an icon, characters, an image such as a sample image that expresses an external shape with a polygon and the like, and the like. For example, the animation image may be a still image or a moving image. An animation image 628-4 displays an image that expresses an intention for showing a lane changing direction of the host vehicle M. In the example of FIG. 6, an image that gives an advance notice of lane changing from the travel lane L1 to the lane L2 by the host vehicle M is displayed. For example, the animation image 628-4 is an image that does not include test information. The animation image 628-4 is a figure indicating a route changing direction of the host vehicle M along a road width direction.

The HMI control unit 120 may allow the peripheral information display region 620-4 to display test information 630-4 that gives an advance notice of route changing of the host vehicle 4. In the example of FIG. 6, a character string of "lane will be change to the right" is displayed as the test information 630-4.

Situation (5)

Figure 7:
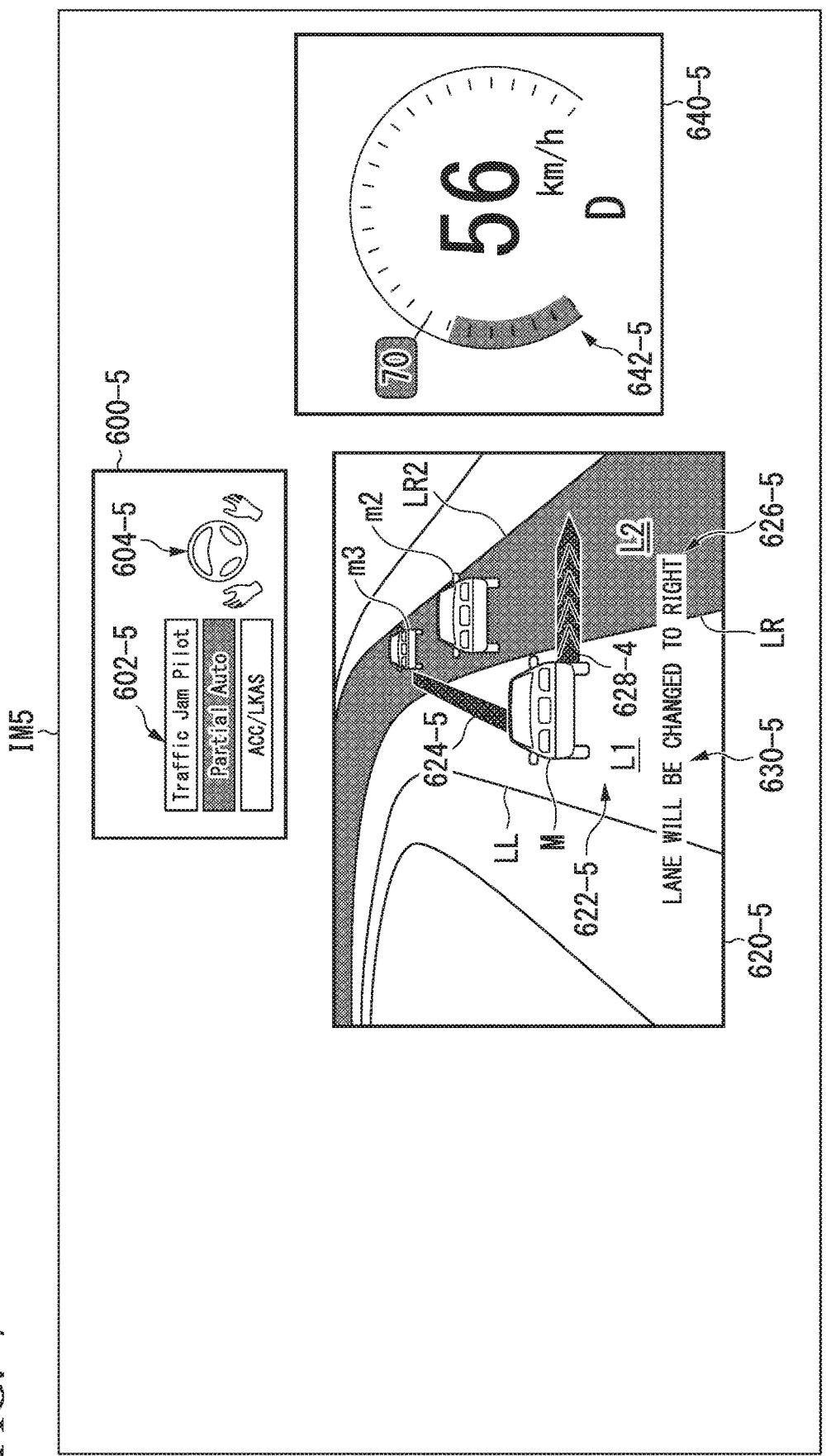
FIG. 7 is a view showing an example of a screen on which a target trajectory of lane change is displayed.

For example, a situation (5) illustrates a situation in which an image of a lane changing target trajectory is displayed. FIG. 7 is a view showing an example of a screen IM5 on which the lane changing target trajectory is displayed. In the situation (5), a display content of a driving assist state display region 600-5 and a display content of the driving assist state display region 600-2, which are allowed to be displayed by the HMI control unit 120, are the same as each other, and a display content of a travel state display unit 640-5 and a display content of the travel state display unit 640-2 are the same as each other. Accordingly, detailed description thereof will be omitted.

With regard to control by the HMI control unit 120, the display content of the peripheral information display region 620-5 and the display content of the peripheral information display region 620-4 are different in display of an image 624-5 indicating a target trajectory. Specifically, the HMI control unit 120 allows the peripheral information display region 620-5 to display the image 624-5 that is generated by the action plan generation unit 323 on the basis of the lane L2 or a behavior of nearby vehicles m2 and m3, and indicates a target trajectory for lane changing of the host vehicle M. In this case, the HMI control unit 120 may allow an aspect of transition from the image 624-4 indicating the target trajectory along the lane L1 illustrated in the peripheral information display region 620-4 to the image 624-5 to be displayed with an animation image by a moving image.

Situation (6)

Figure 8:
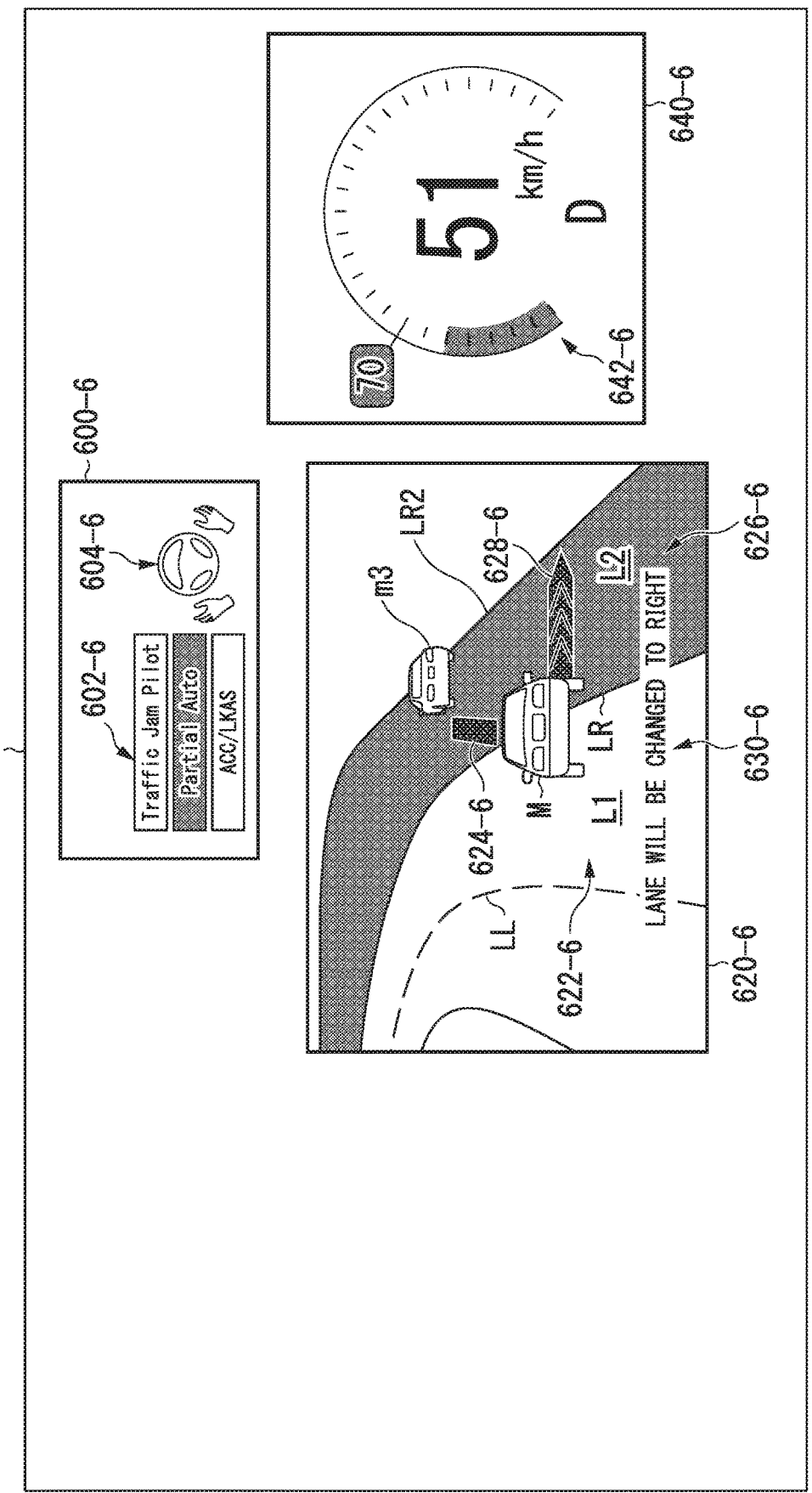
FIG. 8 is a view showing an example of a screen that is displayed while the host vehicle M executes lane change.

For example, a situation (6) illustrates a situation during execution of lane changing by the host vehicle M. FIG. 8 is a view showing an example of a screen IM6 that is displayed during execution of lane changing by the host vehicle M. In the situation (6), a display content of a driving assist state display region 600-6 and a display content of the driving assist state display region 600-2, which are allowed to be displayed by the HMI control unit 120, are the same as each other, and a display content of a travel state display unit 640-6 and a display content of the travel state display unit 640-2 are the same as each other. Accordingly, detailed description thereof will be omitted.

In a case where the host vehicle M executes lane changing, the HMI control unit 120 allows the peripheral information display region 620-6 to display a position of the host vehicle M with respect to the lanes L1 and L2 and a position of a nearby vehicle while changing the positions in real time in correspondence with position information of the host vehicle M. The HMI control unit 120 changes a length of an image 624-6 indicating the target trajectory, and a length of an animation image 628-6 of lane changing on the basis of a distance from the lane L2 that is a lane changing destination. According to this, the occupant can easily understand a remaining distance until completion of lane changing, and the like.

For example, in a case where the vehicle system 1 executes driving assist of the TJP, the HMI control unit 120 allows an image indicating an indicator of "Traffic Jam Pilot" in the image 602 of the three indicators to be displayed in a color (third color) different from that of the other indicators. For example, the third color is a color different from the first color and the second color. The third color may be set to a similar color with the second color. According to this, it is possible to identify driving assist in the ACC, the LKAS, and the like and driving assist in automated driving. The HMI control unit 120 allows the driving assist state display region 600 to display a request operation notification image that makes a request for the occupant to separate hands from the steering wheel in a similar color with the third color. The HMI control unit 120 allows the peripheral information display region 620 to display approximately the entire region 622-2 of the lane L1 that resembles a road on which the displayed host vehicle M travels in a similar color with the third color, and allows the image 624 of the target trajectory to be displayed in a region narrower than the lane L1 in a similar color with the third color.

The HMI control unit 120 allows the above-described images or regions to be displayed in the first color to third color which correspond to the degree of driving assist. However, in addition to this, at least one of the light-emitting units F to K may be lighted or flickered in a similar color at a timing at which the images or regions are displayed in respectively colors. According to this, the occupant can understand a driving assist state with respect to the host vehicle M only when viewing the light-emitting units F to K.

Processing Flow

Figure 9:
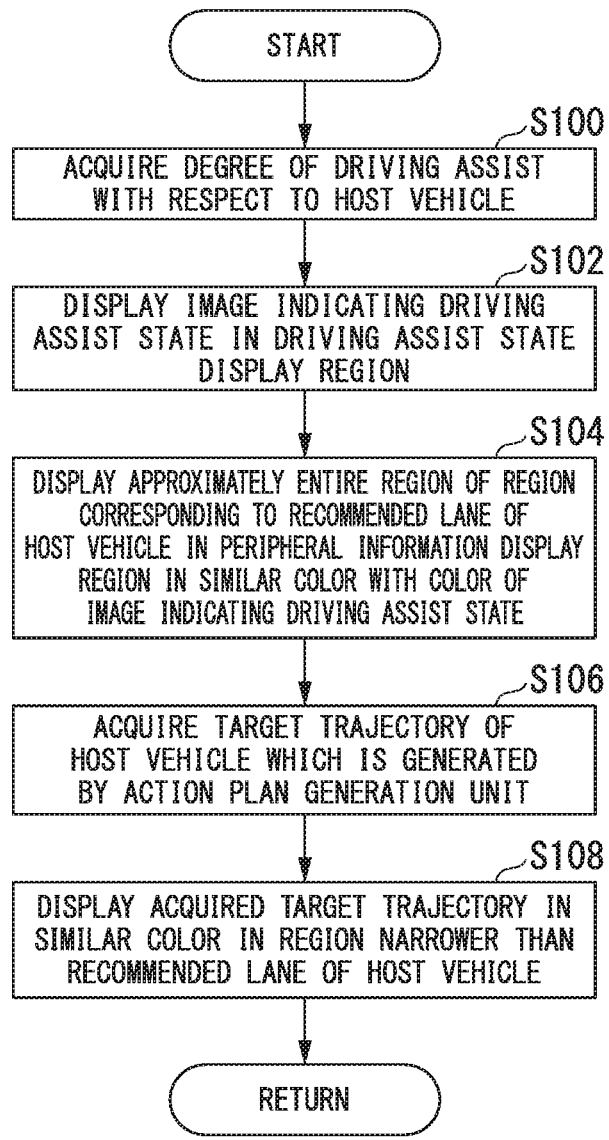
FIG. 9 is a flowchart showing an example of a flow of processing that is executed by an HMI control unit.

FIG. 9 is a flowchart showing an example of a flow of processing that is executed by the HMI control unit 120. For example, the processing of FIG. 9 is repetitively executed at a predetermined timing. In the example of FIG. 9, it is assumed that driving assist is executed with respect to the host vehicle M at the second degree or the third degree. First, the HMI control unit 120 acquires the degree of driving assist with respect to the host vehicle M (step S100), and allows the driving assist state display region 600 to display an image indicating a driving assist state corresponding to the degree of driving assist (step S102).

Next, the HMI control unit 120 allows the peripheral information display region 620 to display approximately the entire region corresponding to a recommended lane of the host vehicle M in a similar color with the image indicating the driving assist state (step S104).

Next, the HMI control unit 120 acquires a target trajectory of the host vehicle M which is generated by the action plan generation unit 323 (step S106), and allows the acquired target trajectory to be displayed in a region narrower than the recommended lane of the host vehicle M in the peripheral information display region 620 in a similar color with the color of the image indicating the driving assist state (step S108). According to this, the processing of this flowchart is terminated.

According to the above-described embodiment, visibility of information related to driving assist is improved, and thus it is possible to allow the occupant to intuitively and visually recognize a driving assist state. According to the embodiment, it is possible to easily understand a lane changing timing of the host vehicle, a timing at which the degree of driving assist is changed, a switching timing of manual driving and automated driving, and the like.

Hardware Configuration

Figure 10:
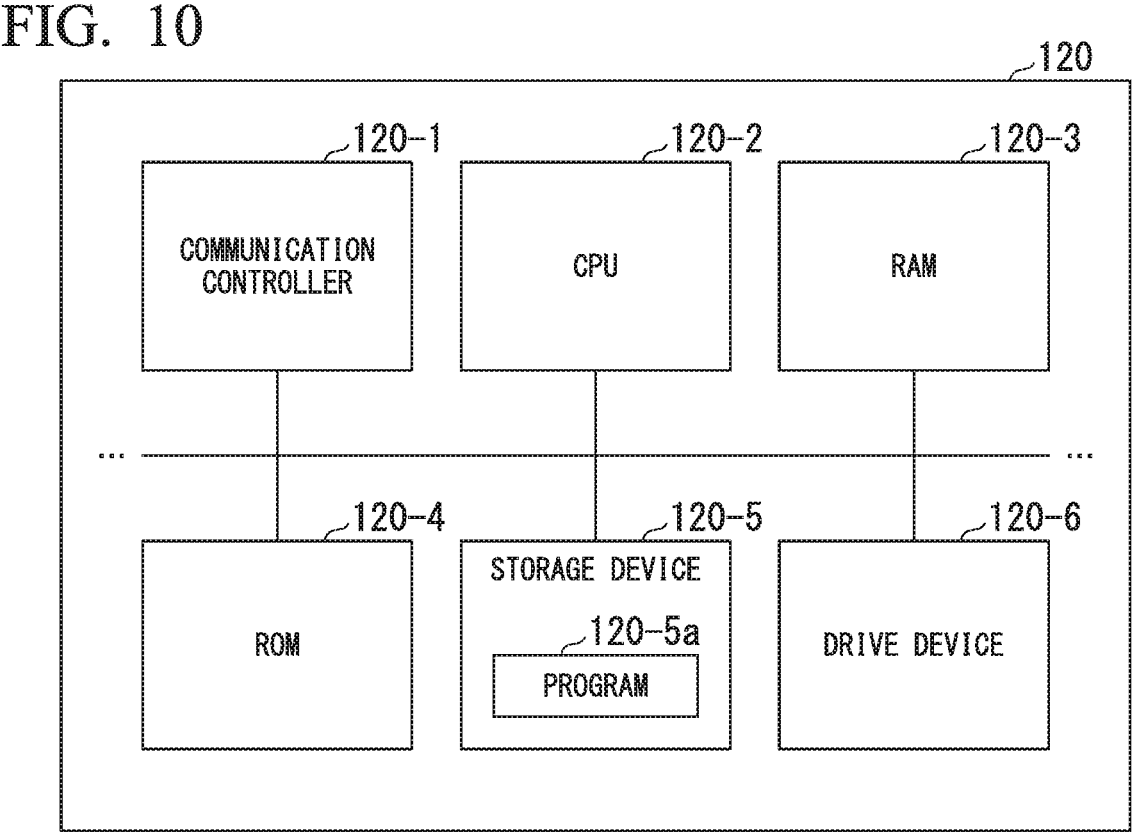
FIG. 10 is a view showing an example of a hardware configuration of the HMI control unit of the embodiment.

For example, the HMI control unit 120 of the display system of the above-described embodiment is realized by a configuration of hardware as illustrated in FIG. 10. FIG. 10 is a view showing an example of hardware configuration of the HMI control unit 120 of the embodiment.

The HMI control unit 120 has a configuration in which a communication controller 120-1, a CPU 120-2, a RAM 120-3, a ROM 120-4, a secondary storage device 120-5 such as a flash memory and an HDD, and a drive device 120-6 are connected to each other through an internal bus or a dedicated communication line. A portable storage medium such as an optical disc is mounted in the drive device 120-6. A program 120-5a that is stored in the secondary storage device 120-5 is developed in the RAM 120-3 by a DMA controller (not illustrated), and is executed by the CPU 120-2. According to this, functional units of the HMI control unit 120 are realized. The program that is referenced by the CPU 120-2 may be stored in the portable storage medium that is mounted in the drive device 120-6, or may be downloaded from another device through a network NW.

The embodiment may be expressed as follows.

A display system including:

a storage device; and a hardware processor that executes a program stored in the storage device, wherein the hardware processor executes the program to allow, a first display unit to display an image indicating a driving assist state of a vehicle which includes an automated driving state, a second display unit to display an image that resembles a road on which the vehicle travels, and the second display unit to display approximately the entire region of a region corresponding to a recommended lane applied to a control unit that performs the automated driving in a predetermined color, and a target trajectory generated by the control unit that performs the automated driving to be displayed in a region narrower than the recommended lane.

Hereinbefore, modes for carrying out the invention have been described with reference to the embodiment. However, the invention is not limited to the embodiment, and various modifications and substitutions can be added in a range not departing from the gist of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display system, comprising:
   a first display unit that displays an image indicating a driving assist state of a vehicle which includes an automated driving state;
   a second display unit that displays an image that resembles a road on which the vehicle travels; and
   a display control unit that allows the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane,
   wherein in a case where lane changing of the vehicle is executed by the automated driving, the display control unit allows approximately the entire region of a lane that is a lane changing destination to be displayed in a predetermined color, and then allows an image that gives an advance notice of the lane changing to be displayed.

2. The display system according to claim 1,
   wherein the display control unit allows approximately the entire region of the region corresponding to the recommended lane to be displayed in a similar color with the image that is displayed by the first display unit and indicates the driving assist state of the vehicle.

3. The display system according to claim 1,
   wherein the display control unit allows the target trajectory to be displayed in a region narrower than a lane in which the vehicle travels in a similar color with the image that is displayed by the first display unit and indicates the driving assist state of the vehicle.

4. The display system according to claim 1,
   wherein the first display unit is at least one of a region different from a region in which the second display unit is displayed in the same display device as the second display unit, a light-emitting unit that is provided in a steering wheel, a light-emitting unit that is provided in a door of the vehicle, and a light-emitting unit that is provided in an instrument panel.

5. The display system according to claim 1,
   wherein in a case where a plurality of lanes, in which the vehicle is capable of travelling in the automated driving, exist, the display control unit allows the second display unit to display the lanes by changing a color for every lane in which travel is possible in correspondence with the degree of recommendation for every lane in which travel is possible.

6. The display system according to claim 1,
   wherein the image that gives the advance notice of the lane changing includes an animation image that gives an advance notice of the lane changing.

7. The display system according to claim 1,
   wherein the display control unit allows the second display unit to display a display color of a lane in which the vehicle travels, and a display color of the target trajectory in a similar color and a color tone that is likely to be visually recognized by an occupant of the vehicle.

8. A display method that is executed by a computer, the method comprising:
   allowing a first display unit to display an image indicating a driving assist state of a vehicle which includes an automated driving state;
   allowing a second display unit to display an image that resembles a road on which the vehicle travels;
   allowing the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane; and
   in a case where lane changing of the vehicle is executed by the automated driving, allowing approximately the entire region of a lane that is a lane changing destination to be displayed in a predetermined color, and then allowing an image that gives an advance notice of the lane changing to be displayed.

9. A computer-readable non-transitory storage medium that stores a program that causes a computer to execute:
   allowing a first display unit to display an image indicating a driving assist state of a vehicle which includes an automated driving state;
   allowing a second display unit to display an image that resembles a road on which the vehicle travels;
   allowing the second display unit to display approximately the entire region of a region corresponding to a recommended lane applied to a control unit that performs the automated driving in a predetermined color, and allows a target trajectory generated by the control unit that performs the automated driving to be displayed in a region narrower than the recommended lane; and
   in a case where lane changing of the vehicle is executed by the automated driving, allowing approximately the entire region of a lane that is a lane changing destination to be displayed in a predetermined color, and then allowing an image that gives an advance notice of the lane changing to be displayed.

* * * * *